United States Patent [19]

Schovee

[11] Patent Number: 4,489,512
[45] Date of Patent: * Dec. 25, 1984

[54] ARTICLE FOR FORMING A PICTURE FRAME

[76] Inventor: John R. Schovee, 10 Burr Oak Dr., Pittsford, N.Y. 14534

[*] Notice: The portion of the term of this patent subsequent to Jul. 5, 2000 has been disclaimed.

[21] Appl. No.: 429,174

[22] Filed: Sep. 30, 1982

Related U.S. Application Data

[63] Continuation of Ser. No. 193,809, Oct. 3, 1980, Pat. No. 4,391,054.

[51] Int. Cl.³ .......................... A47G 1/06; B32B 31/18
[52] U.S. Cl. ............................................. 40/154; 40/156; 40/155; 52/656; 403/401; 156/73.1; 156/73.3
[58] Field of Search ..................... 40/152, 152.1, 152.2, 40/155, 154, 156; 403/401; 52/656; 156/73.1, 73.3

[56] References Cited

U.S. PATENT DOCUMENTS

| | | | |
|---|---|---|---|
| 2,255,151 | 9/1941 | Clements | 403/401 |
| 4,224,091 | 10/1980 | Sager | 40/152 |
| 4,391,054 | 7/1983 | Schovee | 40/154 |

*Primary Examiner*—Gene Mancene
*Assistant Examiner*—Cary E. Stone

[57] ABSTRACT

Article for forming picture frames and molding and the picture frame and molding made thereby, wherein the picture frame molding includes a fusible strip running the entire length thereof and wherein the abutting sections of molding at the corners of the frame are held together by the abutting fusible strips being fused together at the corners. The frame is preferably wood and the fusible strip is preferably a thermoplastic material that can be fused to itself by for example ultrasonic welding. Also, the dust cover or backing for the picture is fusible to the back of the picture frame sections.

30 Claims, 9 Drawing Figures

ARTICLE FOR FORMING A PICTURE FRAME

BACKGROUND OF THE INVENTION

Cross-Reference to Related Application

This application is a continuation of application Ser. No. 193,809, filed Oct. 3, 1980 now U.S. Pat. No. 4,391,054.

Field of the Invention

This invention relates to picture framing and particularly to improved molding and articles for use in picture framing.

Description of the Prior Art

Generally the prior art method used to produce a picture frame from wood is to cut the molding with the proper length and with 45° mitered corners, to then hold two mating and abutting mitered ends, in contact, drill one or more holes through the abutting pieces, nail one or more nails through the holes countersink the nails, place an amount of putty in the recessed nail holes, and often times glue is also inserted between the opposing mitered surfaces. Each corner is joined in this same manner.

In attempts to overcome the problems of such prior art picture frames, a variety of solutions have been attempted such as a slot and a wedge across the mitered corners (U.S. Pat. No. 3,336,689), and an elastic band embracing the frame (U.S. Pat. No. 2,826,843). But, basically picture frames are still commercially made by the nailing method.

It is a primary object of the present invention to provide improved picture frames which are more economical, faster, easier and simpler than the prior art.

SUMMARY OF THE INVENTION

One of the purposes of the present invention is to provide a picture frame and molding comprised primarily of wood, containing a continuous strip of fusible plastic forming an inner plastic frame running the entire length of each frame section. The cross-sectional shape of the groove that said fusible strip of plastic lies in is of such a shape that said plastic strip is keyed in the groove.

One object of this invention, relative to the wood frame, is to provide the formation of a secure 45° mitered corner without additional drilling, or use of nails. Instead, an ultrasonic fuser will fuse the mitered ends of the thermoplastic strips to secure the mitered corners.

One object is to provide frame molding which provides picture framers a method of construction for making frames, which will make picture framing more economical, faster, easier and simpler than previous methods.

Additional objects and features of this invention will appear from the following description in which the preferred embodiment is set forht in conjunction with the accompanying drawing.

DETAILED DESCRIPTION OF THE PREFERRED EMBODIMENT

Figure 1:
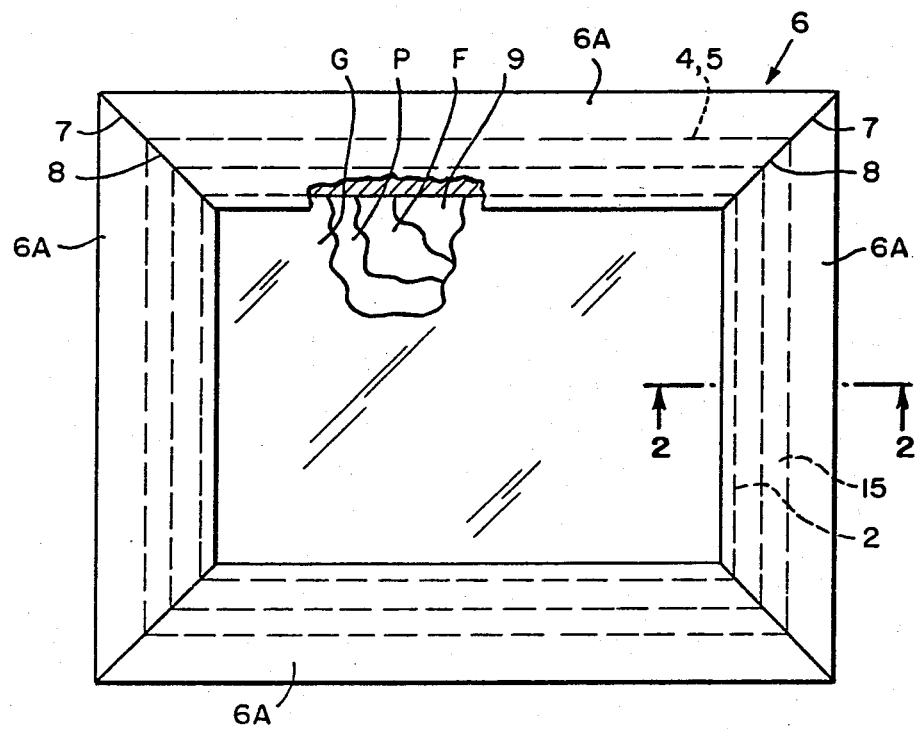
FIG. 1 is a plan view of the face of a picture frame incorporating the present invention.

The picture frame shown in FIG. 1 provides a frame 6 consisting of four frame sections or members 6A which are molding strips consisting primarily of wood molding or other suitable material and secondarily having a thermoplastic strip 5 incorporated therein. The thermoplastic strips 5 may be any suitable material which can be ultrasonically or otherwise fused to itself, for example, unsaturated polyesters, polyamides, and the like. The plastic strip 5 is keyed in a groove 4 on the back of the wood frame section 6A. The mitered corners 7, are held fast by a fused plastic joint 8 made in accordance with this invention.

In the FIG. 1 embodiment, the picture P, the glass G, and the picture filler F are prevented from moving laterally or longitudinally by the frame 6, preferably wood. Each piece of molding is rigid with respect to the other molding pieces. The frame is held rigid by the interconnected fused continuous plastic strips 5 defining a continuous plastic inner frame 15 that is keyed to the frame 6 by the groove 4 and fused at the corner joints 8. This results in a rigid picture frame without the use of nails and provides the continuous plastic inner frame 15 comprising the fused plastic strips 5 extending around and holding the adjacent frame sections 6A in rigid permanent relationship. It will be understood that each thermoplastic strip 5 can be any one of a number of suitable polyethers or nylons or any other composition suitable for fulfilling the requirements of this invention.

In the FIGS. 2a-d embodiment, there is a groove 2 cut out of the inside of the frame 6. The groove 2 locates and holds the glass G, the picture P and the cardboard filler F in the frame. The plastic strip 5 is keyed in the groove 4 so that the plastic strip 5 cannot be removed from the wood frame 6 after the corner joints 8 are fused. A dust cover or backing material 9 completely covers the back of the picture filler F and preferably extends across and interface with the plastic strip 5. If said dust cover 9 is of a paper material it is to be attached to the frame by tacks or glue. If said dust cover 9 is of a thermoplastic material or paper board or other suitable material which has thermoplastic material impregnated in it, then it may be fused to the thermoplastic strips 5 by means of ultrasonics or other means of applying heat sufficient to fuse and join with strips 5. It is preferable to provide a thick and/or strong dust cover 9 with this invention so it will be strong enough to support the glass G, picture P and backing B in engaging relationship with the forward edge of the groove 2.

Figure 2A:
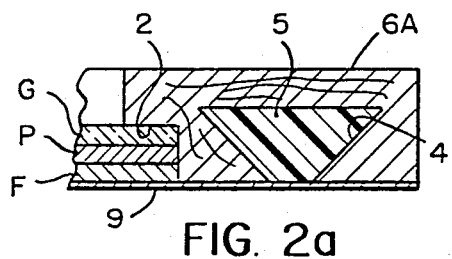
FIGS. 2a-d are enlarged alternative cross-sectional views taken along the line 2—2 of FIG. 1.

The alternative cross-sectional FIGS. 2a-d of the plastic strip(s) 5 which form a continuous fused strip around and securing the frame members 6A consist of the four following alternative constructions:

In the FIG. 2a embodiment, there is a single plastic strip that is trapezoidal in cross-section.

Figure 2B:
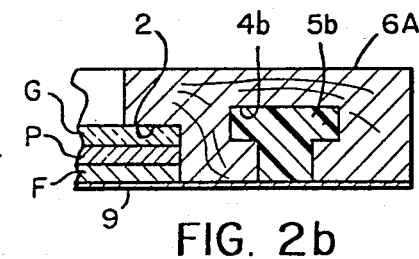

In the FIG. 2b embodiment, there is a single plastic strip that is "T"-shaped in cross-section.

Figure 2C:
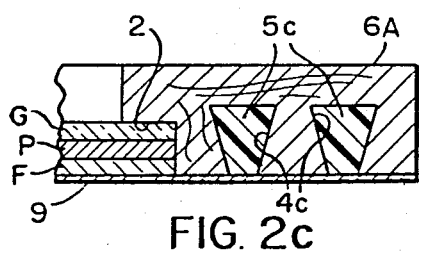

In the FIG. 2c embodiment, there are a plurality of plastic strips that are trapazoidal in cross-section.

Figure 2D:
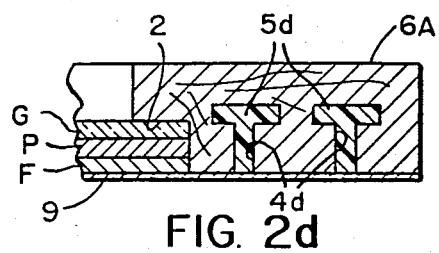

In the FIG. 2d embodiment, there are a plurality of plastic strips that are "T"-shaped in cross-section.

Figure 3:
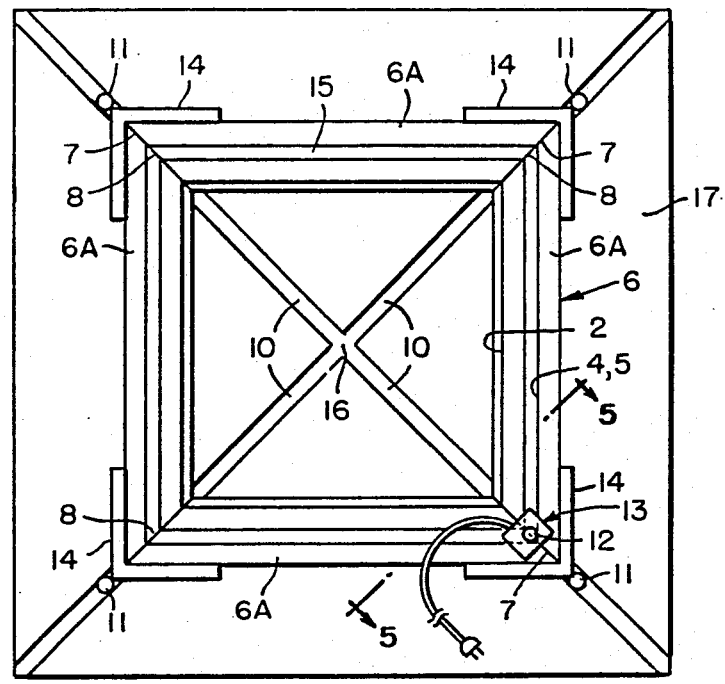
FIG. 3 is a plan view of the back of a picture frame incorporating the present invention being held in a table top vice which aids in the fusing of the molding.
Figure 4:
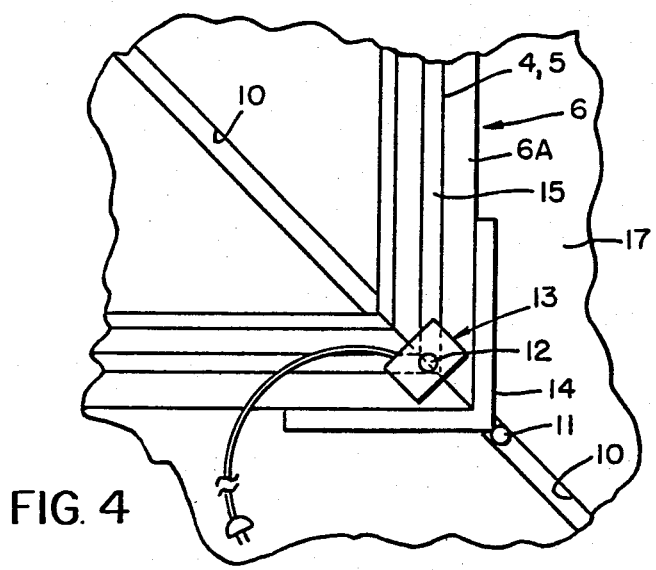
FIG. 4 is an enlarged fractional plan view.
Figure 5:
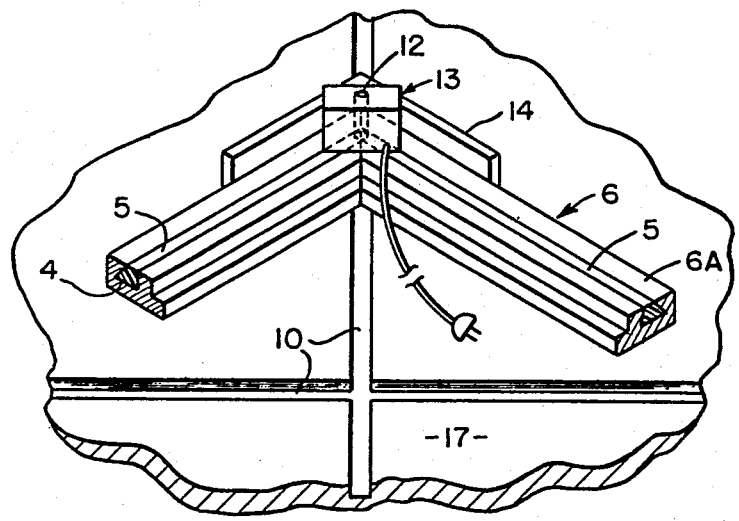
FIG. 5 is an enlarged, broken away perspective view taken substantially along the line 5—5 of the frame in FIG. 3.

In the FIGS. 3, 4, and 5 embodiment, I have provided an apparatus for fusing the thermal plastic strip 5 at the mitered corners 7 to form the corner joint 8. The frame is held in place by "L"-shaped braces or corner holding members 14 at each corner. Each brace 14 is attached to a guide 11 that mates with and slides in a track 10 mounted on a table top or floor 17. The braces 14, each comprising a pair of walls adapted for embracing one corner of the frame being made, can be adjusted lengthwise of the track 10 according to the size of the frame being constructed. The ultrasonic or heat unit 13 is used to fuse the said plastic strip 5 at the mitered and fused corner joints 8. The contact point of the ultrasonic or heater unit 13 is carried on a shaft 12 that extends downwardly out of the unit 13.

The guide 11 and track 10 system can be of the common type which is capable of two functions. First, each guide 11 slides freely in the track 10 for the purpose of adjusting the brace 14 to different selected positions for different size frames. Secondly the guide 11 can be spring biased or locked by any suitable clamping means in selected positions along the track while producing compressive forces to frame sections 6A of the frame 6. This will allow the mitered plastic corner joints 8 to be fused by the ultrasonic or heat unit 13, preferably while the adjacent abutting frame sections 6A are all maintained in proper positions to form the frame 6 while slightly under compression by the braces 14, so the mitered corners will fit as tightly as possible and the adjacent frame sections or members 6A are maintained in pressure bearing relationship, and the corner joints 8 can be formed simultaneously by using multiple heater units 13.

Preferably, the track 10 used to retain the guide 11, is mounted in a table. Preferably the track 10 is recessed in the table top 17 so that the picture frame 6 lies flush on the table top while in the braces 14. Also, preferably a spring or other biasing means is provided in the tracks 10 tending to bias the braces 14 toward the center 16 of the tracks 10 thereby to help maintain the abutting adjacent frame sections 6A in compression.

It will be understood that while the heater unit 13 is fusing the plastic corner joints 8 it can also fuse a thermoplastic dust cover 9 to the plastic corner joints 8 being formed; and if desired, the dust cover 9 can thereafter be sealed to the entire continuous thermoplastic strips 5 thus formed around the back of the frame. Or, the dust cover 9 can be sealed to the thermoplastic strips 5 after the plastic corner joints 8 are completed.

Figure 3A:
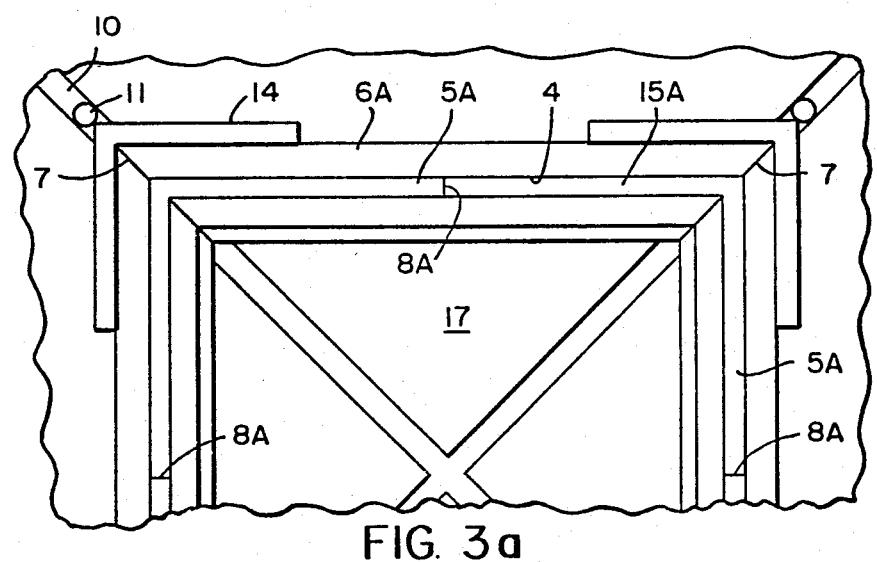
FIG. 3a is an alternative enlarged fractional plan view of the back of the picture frame shown in FIG. 3.

While the embodiment in FIGS. 1-3, 4 and 5 above described of my invention is the preferred embodiment, the following is an alternative construction described with reference to FIG. 3A. In lieu of the continuous plastic inner frame 15 formed by the fusing the plastic strips 5 at the corners, a right angular partial strip 5A which extends halfway along the frame members 6A into the grooves 4 of the abuttting adjacent frame members 6A. The right angular strip 5A is inserted in each groove 4 of abutting adjacent frame members 6A as each corner is formed. After the frame is completely formed at all four corners with the right angular strips 5A inserted, the four corner braces 14 retain the frame in position while ultrasonic heat is applied at the abutted end 8A of right annular strips 5A, thereby to bond the strips 5A together to form a continuous thermoplastic inner frame 15A.

It will be understood that, according to my method of making a picture frame, the thermoplastic or thermoplastic impregnated dust cover 9 may be best sealed around the back of the frame 6 after the frame 6 is bonded together at the corners and the glass G and/or picture P and/or filler F have been received in the bonded together frame 6. The bonding of the dust cover 9 to the frame may be a part of or separate from the method making a frame regardless of using the method of bonding the corners of the frame 6.

If the fusible dust cover or backing material 9 is of sufficient strength and rigidity in relation to the weight of the frame 6, then the duct cover or backing material 9 when bonded to the back of the frame members 6A will maintain the frame members 6A in adjacent picture framing position forming a frame 6 without the necessity of any bonding to the adjacent frame members 6A at the corners or midway. In this regard, it is particularly desirable if the backing material 9 is shrinkable thermoplastic material so that it will tend to maintain the adjacent corner edges of the frame members 6A in tight abutting relationship after the backing material 9 has been bonded thereto and shrunk. For example heat shrinkable polyurathanes, polypropalenes or polyacrylic could be used for such backing materials.

It will be understood that when the backing material 9 is used to provide the holding force to maintain the adjacent corner edge of the frame members 6A in tight abutting relationship, that it would not be necessary for the thermal strips 5 or 5A to extend continuously around the groove 4, but could be smaller spaced strips along the groove 4.

The invention has been described in detail with particular reference to the preferred embodiments thereof, but it will be understood that variations and modifications can be effected within the spirit and scope of the invention as described hereinabove and as defined in the appended claims.

I claim:

1. Picture frame molding comprising a length of molding and a strip of plastic material running the length of said molding, said strip being adapted to be cut and bonded at a selected cutting position lengthwise of said molding.

2. A picture frame molding comprising a length of molding, a groove in the back surface of said molding and a strip of plastic material in said groove, said strip being adapted to be cut and bonded at a selected position lengthwise of said molding.

3. The article according to claim 2 wherein said groove is a key shape in cross-section having a width wider than the width of an opening said groove makes in back surface of said molding whereby said strip cannot be removed transversely from said groove.

4. The article according to claim 2 wherein said molding is primarily wood and said plastic strip is a thermoplastic material capable of being fused.

5. Picture frame molding comprising a length of molding and a strip of fusible material running the length of said molding, said strip of fusible material being adapted to be cut and fused at a selected cutting position lengthwise of said molding.

6. A method for making a picture frame molding for use in making a picture frame comprising providing a groove along a surface of said molding and inserting a plastic strip the entire length of said groove before the molding is cut to form a corner.

7. The method according to claim 6 wherein said groove is key shaped in cross-section and said groove having a width wider than the width of an opening formed in said back surface of said molding by said groove.

8. The method according to claim 6 wherein said molding is wood and said providing step comprises cutting said groove and wherein said inserting step comprises inserting thermoplastic material capable of being ultrasonically welded to itself into said groove.

9. A method for making a frame molding ready for use in making a frame comprising providing a groove along a surface of said molding and inserting a plastic strip the entire length of said groove before the molding is cut to form a corner for forming a frame molding ready for making a frame without removing said strip from said molding.

10. A method of making frames comprising bonding a plastic backing material to a common surface of each section of a frame to be made while said backing material extends between said sections.

11. A method according to claim 10 in which said backing material has sufficient rigidity and strength to maintain said sections of said frame in selected framing positions when bonded thereto.

12. A method according to claim 10 in which said backing material is a thermoplastic material.

13. A method according to claim 10 including a step of maintaining adjacent corner edges of said sections in adjacent framing position while bonding said backing material to said sections.

14. A method according to claim 10 including a step of maintaining adjacent corner edges of said sections in pressure bearing relationship while bonding said backing material to said sections.

15. A method of making frames comprising providing a frame having a plastic surface along a common surface of each section of molding of the frame, bonding a plastic backing material to said plastic surface of each section of a frame to be made while said backing material extends between said sections.

16. A method according to claim 15 in which said backing material has sufficient rigidity and strength to maintain said sections of said frame in selected framing positions when bonded thereto.

17. A method according to claim 15 including a step of maintaining adjacent corner edges of said sections in adjacent framing position while bonding said backing material to said sections.

18. A method according to claim 15 including a step of maintaining adjacent corner edges of said sections in pressure bearing relationship while bonding said backing material to said sections.

19. A method of making frames comprising bonding a backing material, having sufficient rigidity and strength to maintain sections of a frame to be made in selected framing positions when bonded thereto, to the back of said sections of a frame while said backing material extends between said sections, without the necessity of said frame sections being otherwise bonded together.

20. A method according to claim 19 including a step of maintaining adjacent corner edges of said sections in adjacent framing position while bonding said backing material to said sections.

21. A method according to claim 19 including a step of maintaining adjacent corner edges of said sections in pressure bearing relationship while bonding said backing material to said sections.

22. In a method of making frames from a plurality of wood frame sections comprising:
 (a) providing wood frame sections having fusible bonding material extending between adjacent sections of said picture frame to be made;
 (b) maintaining said adjacent sections in pressure bearing relationship; and
 (c) fusing said fusible material thereby to bond said adjacent sections together to form a picture frame.

23. A method according to claim 22 in which said providing step includes providing wood sections having fusible bonding material in each section at adjacent edges of each section.

24. In a method of making frames from a plurality of wood frame sections comprising:
 (a) providing a length of wood frame molding having fusible bonding material extending into said wood at an adjacent corner edge to be formed;
 (b) cutting said molding across said fusible bonding material at said adjacent corner edge;
 (c) abutting a plurality of sections of said molding at said adjacent corner edges thereof;
 (d) fusing the abutting adjacent corner edges of said sections together to form corners, whereby said sections of molding are held together to form a frame.

25. A method according to claim 24 in which said providing step includes providing wood sections having fusible bonding material in each section at adjacent edges of each section.

26. A method in accordance with claim 24 in which said providing step includes providing said fusible bonding material in the form of a fusible strip extending along the length of said molding.

27. The method according to claim 24 wherein said fusible bonding material is a thermoplastic material capable of being welded together by ultrasonic welding.

28. The method according to claim 24 wherein said fusing step comprises applying ultrasonic energy to the adjacent corner edges of said sections sufficient to ultrasonically weld such sections together.

29. A picture frame comprising a plurality of sections of wood molding matingly abutted together at corners to form a frame, each of said sections of said molding having fusible bonding material extending into said wood molding of adjacent sections of said picture frame at each corner thereof, and said sections being fused together at said corners, whereby said sections of wood molding are held together by said fused fusible bonding material at said corners to form said frame.

30. The frame according to claim 29 wherein said bonding material is thermoplastic material ultrasonically weldable together at said corners.

* * * * *